United States Patent
Colwell et al.

(10) Patent No.: US 6,929,335 B2
(45) Date of Patent: Aug. 16, 2005

(54) CRAWLER SHOE WITH PEENING PADS IN ROLLER PATH

(75) Inventors: Joseph J. Colwell, Hubertus, WI (US); Gary R. Borkowski, Milwaukee, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 10/755,778

(22) Filed: Jan. 12, 2004

(65) Prior Publication Data

US 2005/0151421 A1   Jul. 14, 2005

(51) Int. Cl.[7] .............................................. B62D 55/20
(52) U.S. Cl. ...................... 305/194; 305/198; 305/201
(58) Field of Search ................................ 305/191, 192, 305/193, 194, 195, 196, 198, 200, 201; 105/129, 105/148; 104/119; 29/891.1

(56) References Cited

U.S. PATENT DOCUMENTS

| | | | |
|---|---|---|---|
| 1,474,967 A | * 11/1923 | Heine | 305/111 |
| 1,976,526 A | * 10/1934 | Tracey | 219/76.14 |
| 2,167,039 A | * 7/1939 | Ekbom | 305/111 |
| 3,359,044 A | 12/1967 | Boggs | 305/57 |
| 4,139,240 A | 2/1979 | Profio et al. | 305/39 |
| 4,278,301 A | * 7/1981 | Gregor et al. | 305/198 |
| 4,433,874 A | * 2/1984 | Melvin | 305/53 |
| 6,220,378 B1 | 4/2001 | Oertley et al. | 180/9.62 |

* cited by examiner

Primary Examiner—Russell D. Stormer
(74) Attorney, Agent, or Firm—James Earl Lowe, Jr.

(57) ABSTRACT

Each crawler shoe comprises a main body having an upper surface, a lower surface, and opposite lateral sides and opposite front and rear sides. Each crawler shoe further includes a mechanism on the main body for articulately and releasably connecting the crawler shoe to an adjacent crawler shoe. Each crawler shoe further includes a roller path on the upper surface of the main body and drive lugs attached to the upper surface of the main body on opposite sides of the roller path. Each crawler shoe further includes an upward extending peening portion so that when a downward force is applied to the peening portion, unrestricted metal flow at the peening portion can occur in a first horizontal direction and in a second horizontal direction greater than 45 degrees from the first horizontal direction. More particularly, the peening portion is greater than 0.1 inch tall, and, in the preferred embodiment, about 0.25 inches tall.

8 Claims, 3 Drawing Sheets

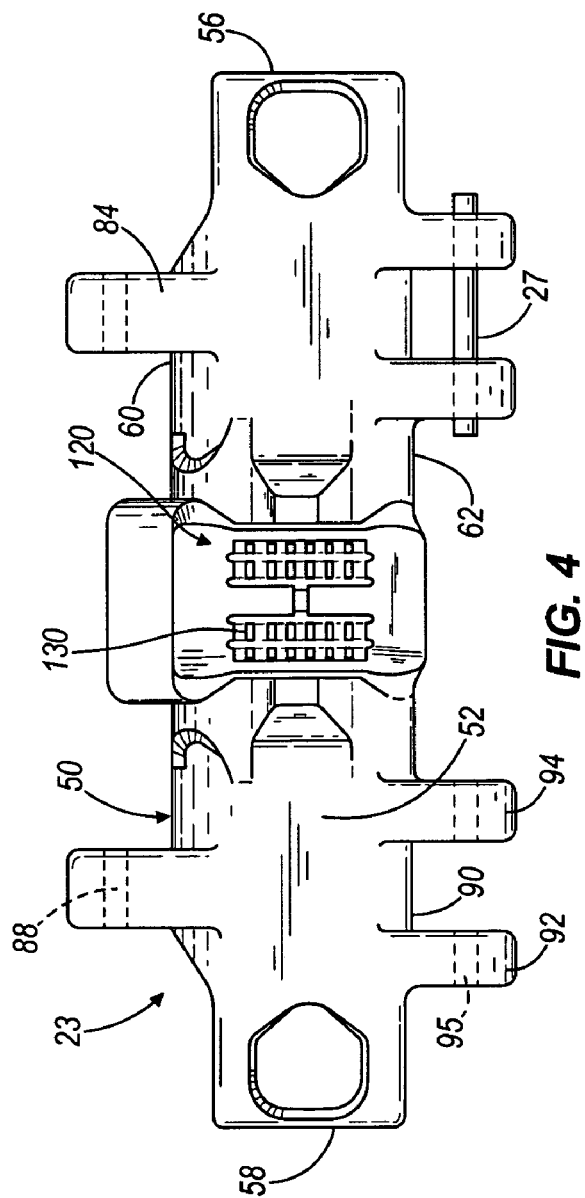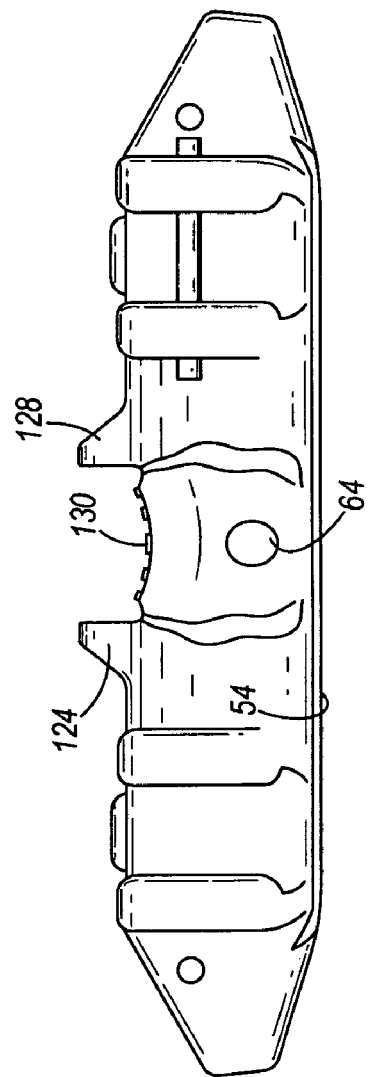
*FIG. 4*
*FIG. 5*

CRAWLER SHOE WITH PEENING PADS IN ROLLER PATH

BACKGROUND OF THE INVENTION

This invention relates to crawler shoes used in crawler tracks for mining shovels or other heavy-duty equipment.

Electric mining shovels use an endless belt of crawler shoes to both distribute the weight of the machine on the ground and to transverse uneven ground conditions. Each shoe must be capable of supporting up to one half of the weight of the machine. The crawler shoes are subjected to wear and tear resulting from operation in dust, mud, rock and highly abrasive soils, shock loads, and other severe operating conditions. Adjacent shoes in a crawler track are connected to one another by means of removable, replaceable pins that permit articulation of adjacent shoes and also enable the shoes to be replaced as they become worn. Such crawler shoes are relatively large, being on the order of seven feet wide, for example, and heretofore have been made by casting steel. In a typical crawler track, heavy-duty forged or cast steel rollers ride upon the upper surface of each shoe and transfer crushing loads thereto from the heavy machinery there above. The load is transferred from lower rollers and idlers on the shovel to the roller path of the shoe. The roller path of the shoe is subjected to high contact stresses in the contact zone of the rollers.

Crawler shoes made of manganese steel possess a unique combination of very good toughness and hardness. A manganese shoe is soft, i.e., it has low tensile strength when new. As the roller path is subjected to high compressive stress above the yield strength, the material deforms or flows. The metal flow changes the grain size and shape and effectively work hardens the material. Typically the roller path of a shoe starts out at 200 BHN (Brinell hardness) when new and then work hardens to 500 BHN or more in service. Metal flowed material is plastically deformed and displaced. The majority of the flow and work hardening occurs near the surface of the roller path and the hardening effects diminish with increasing depth in the section of the shoe. The majority of metal flow occurs at early hours of the shoes life. The rate of metal flow decreases significantly as the material on the surface work hardens.

As illustrated in FIG. 1, the prior art shoes 100 have included peening groves 104 in order to allow the manganese steel to flow into them. The peening groves are parallel groves that extend in the direction of the roller path 108, thus allowing the material to work harden without producing undesirable metal flow into other functional areas of the shoe. In other shoes (not shown), half of the roller path had peening grooves angled at about 45 degrees in one direction to the direction of the path of the roller, and the other half of the roller path had peening groves angled at about 45 degrees in the opposite direction to the direction of the path of the roller.

SUMMARY OF THE INVENTION

On some shoes, it has been found that the plastic flow on the surface of the roller path is responsible for cracking on the internal cores under the roller path of the shoes. As the metal flows, the surface deforms biaxially, much like rolling a pie crust in two directions. The material under the deformed material is then placed in a state of residual tensile stress as it balances the residual biaxial compressive stress on the top surface of the shoe. In severe cases, the deformed material on the top surface of the roller path can not be balanced by the supporting material under the roller path. When this occurs, the supporting material elongates and then cracks to compensate for the dimensional growth on the top of the roller path surface.

One of the principal objects of the invention is to eliminate high compressive residual stress in the roller path after work hardening of the roller path.

Another of the principal objects of the invention is to eliminate severe elongation and residual compressive stresses that can result in gross geometrical changes to the crawler shoes. These changes can cause interference between shoes, known as binding, or back bending, which is when the entire shoe bends downward at the ends. When back bending is severe enough, it can inhibit the shoes from hinging because the pins are no longer on a common axis.

This invention provides a crawler shoe comprising a roller path on an upper surface of a main body, and an upward extending peening portion in the roller path so that when a downward force is applied to the peening portion unrestricted metal flow can occur at the location of the peening portion in a first horizontal direction and in a second horizontal direction greater than 45 degrees from said first horizontal direction.

BRIEF DESCRIPTION OF THE DRAWINGS

FIG. 4 is a top view of a crawler shoe in accordance with this invention.

FIG. 5 is a front view of a crawler shoe in accordance with this invention.

Figure 1:
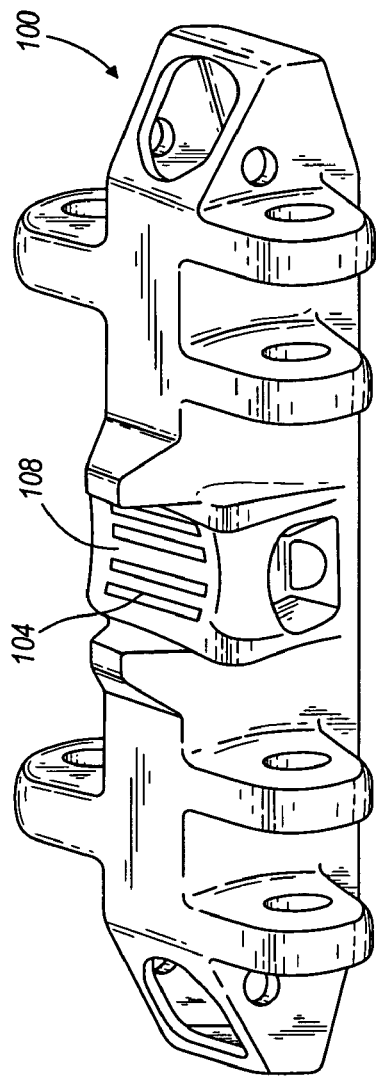
FIG. 1 is a perspective view of a conventional crawler shoe that has peening grooves.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

Figure 2:
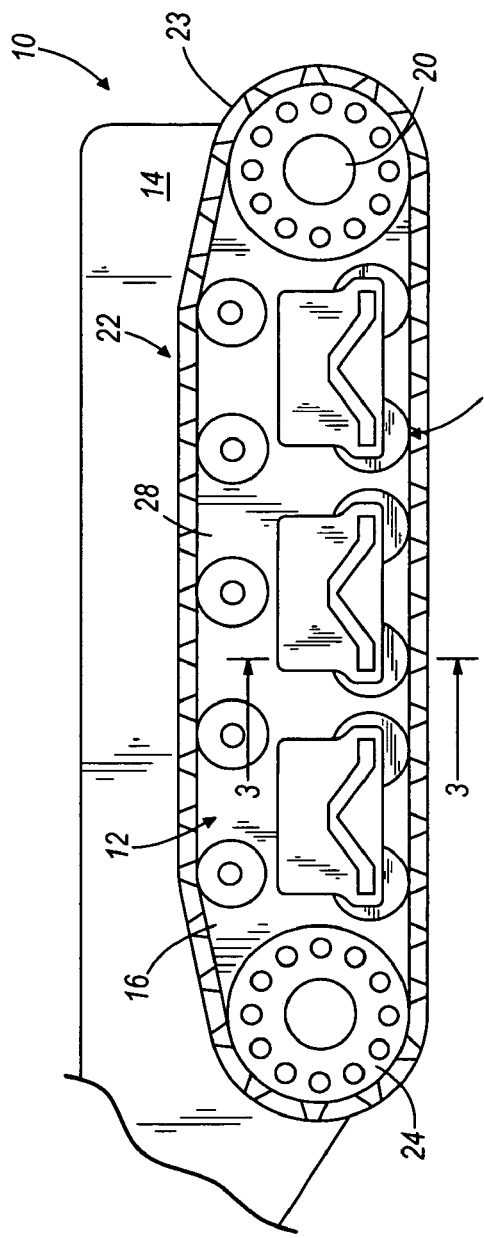
FIG. 2 is a side view of several track shoes in accordance with the invention joined together to form a crawler track.

FIG. 2 shows a schematic illustration of part of a machine 10, such as an electric shovel, with an endless crawler track 22. The machine 10, which if an electric shovel, is on the order of seventy feet high and weighs about 500 to 1600 tons, comprises a lower section 12 and a rotatable upper section 14 mounted thereon. Lower section 12 comprises a crawler frame 16 on which are mounted a plurality of crawler roller assemblies 18 and propelling machinery 20. The crawler track 22 is mounted on the roller assemblies 18 and on the propelling machinery 20. Another crawler track (not shown) is used on the backside of the lower section 12 shown in FIG. 2. Referring to FIG. 2, the crawler track 22 is driven by the propelling machinery 20 in a conventional manner by a crawler drive tumbler 24.

The crawler track 22 comprises a plurality of crawler shoes 23 which are identical to one another. Adjacent shoes 23 are connected to one another by means of removable, replaceable pins 27 (only one of which is shown) that permit articulation of adjacent shoes 23 and also enable the shoes 23 to be replaced as they become worn. Such crawler shoes 23 are relatively large, being on the order of seven feet wide, for example, and are usually made by casting.

Figure 3:
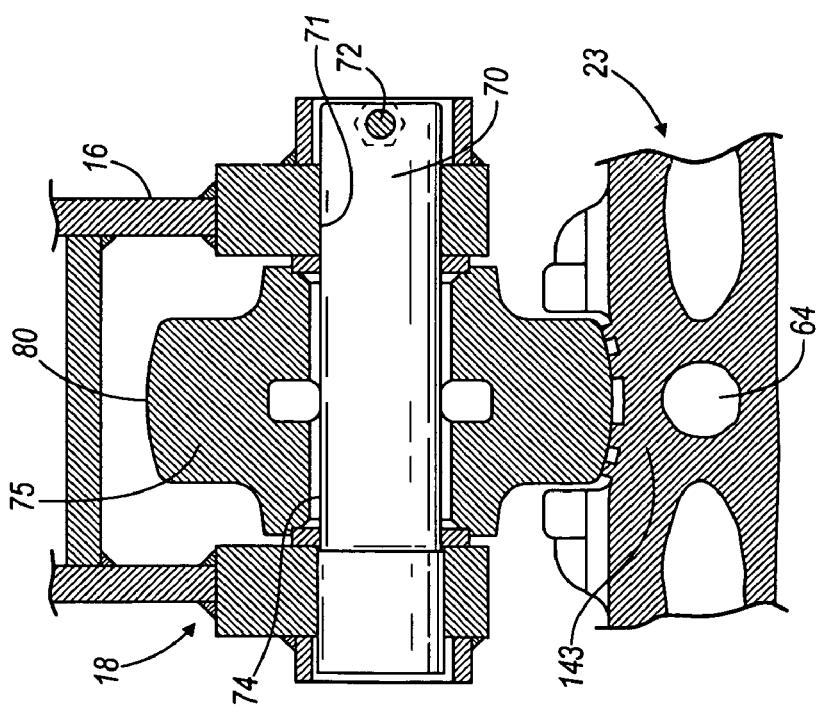
FIG. 3 is a cross-sectional view of a crawler roller assembly taken on line 3—3 of FIG. 2.

As shown in FIGS. 2 and 3, each crawler shoe 23 further cooperates with the plurality of the crawler roller assemblies 18 which are supported on the crawler frame 16. Each crawler roller assembly 18 comprises a shaft 70, which is journaled and supported in openings 71 in the frame 16 and secured in place by a coupling bolt and nut 72. The bushing 74, supported in roller 75, rotates in and is supported by the shaft 70. The track roller 75 is a forged alloy steel roller having a smooth circular slightly crowned circumferential surface 80.

More particularly, as shown in FIGS. 4 and 5, each crawler shoe 23 comprises a main body 50 having an upper surface 52, a lower surface 54, opposite lateral sides 56 and 58 and opposite front and rear sides 60 and 62. The main body 50 is preferably cast from manganese steel, and more preferably, 12 to 14 percent manganese by weight manganese steel, with a number of hollow cores 64 to help reduce the weight of the crawler shoe 23. More particularly, the main body 50 includes a pair of link pin lugs or projections 84 that extend from the front side 60 of the main body 50. Each link pin lug 84 is provided with a pinhole 88. The main body 50 is also provide with a pair of indentations or recesses 90 which extend inwardly from the rear side 62 and which are in alignment with the link pin lugs 84. The recesses 90 are adapted to receive the link pin lugs 84 of an adjacent crawler shoe. The recesses 90 result in the formation of wings 92 and 94. Each wing is provided with a pinhole 95.

Figure 6:
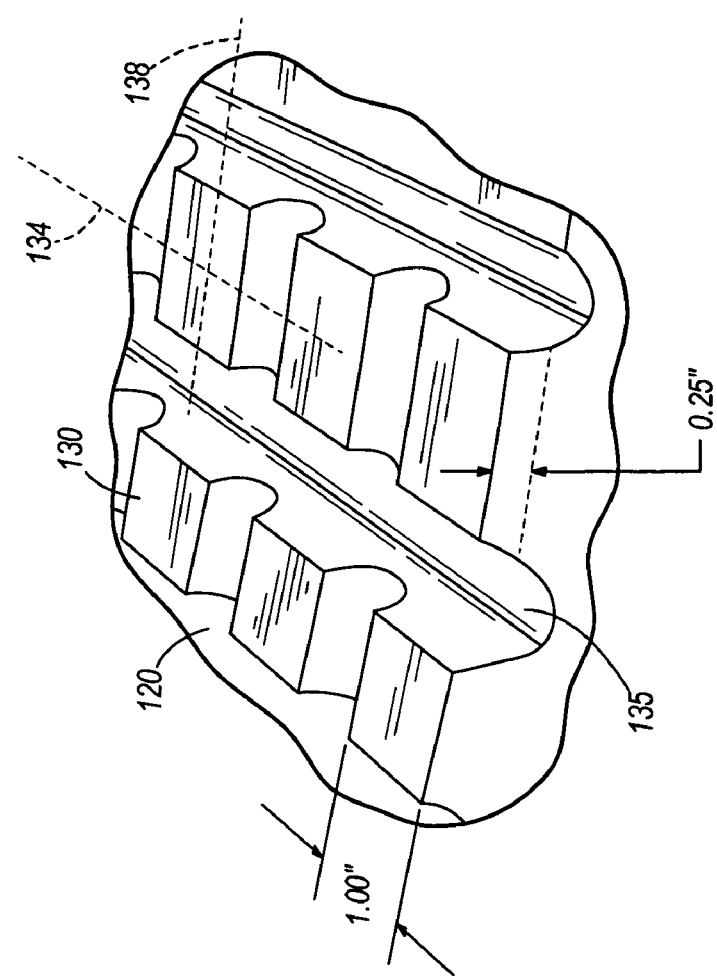
FIG. 6 is an enlarged perspective view of the peening pads in the roller path of the crawler shoe of this invention.

Each crawler shoe 23 further includes a roller path 120 on the upper surface 52 of the main body 50 and drive lugs 124 and 128 attached to the upper surface 52 of the main body 50 on opposite sides of the roller path 120. Each crawler shoe 23 further includes an upward extending peening pad or portion 130 so that when a downward force is applied to the peening portion 130, unrestricted metal flow can occur at the location of the peening portion 130 in a first horizontal direction 134 (see FIG. 6) and in a second horizontal direction 138 greater than 45 degrees from the first horizontal direction 134. More particularly, the metal can flow in a second direction 90 degrees from the first direction. Still more particularly, the peening portion 130 is greater than 0.1 inch tall, and, in the preferred embodiment, about 0.25 inches tall.

Still more particularly, the shoe roller path 120 includes a plurality of the spaced apart peening portions 130, and, in the preferred embodiment, the peening portions 130 are each spaced apart by greater than 0.25 inches, and preferably by about 0.5 inches. And in the preferred embodiment, each of the peening portions 130 is about 1 inch square. In other embodiments (not shown), the pads can be star shaped, diamond shaped, cone shaped, etc. And in still other embodiments (not shown), the pads can be formed from crisscrossing peening grooves.

Although in the illustrated embodiment peening grooves 135 are present, in other embodiments (not shown), the peening grooves 135 can be omitted.

In practice, the soft manganese steel quickly work hardens after the crawler shoe 23 is put into use. The roller 75 will engage the peening pads 130 and cause unrestricted metal flow at the location of the peening pads. As the metal flows, the roller path surface deforms biaxially, much like rolling a piecrust in two directions. Because of the peening pads 130 biaxial material flow, the material 143 (see FIG. 3) just under the roller path surface is affected less than in the prior art crawler shoes.

Various other features and advantages of the invention will be apparent from the following claims.

What is claimed is:

1. A crawler shoe comprising:
a main body having an upper surface, a lower surface, opposite lateral sides and opposite front and rear sides,
means on said main body for articulately and releasably connecting said crawler shoe to an adjacent crawler shoe,
a roller path on said upper surface of said main body, and
an upward extending peening portion in said roller path so that when a downward force is applied to the peening portion unrestricted metal flow can occur at the location of the peening portion in a first horizontal direction and in a second horizontal direction greater than 45 degrees from said first horizontal direction.

2. A crawler shoe in accordance with claim 1 wherein said peening portion is greater than 0.1 inch tall.

3. A crawler shoe in accordance with claim 2 wherein said peening portion is about 0.25 inches tall.

4. A crawler shoe in accordance with claim 1 wherein said shoe roller path includes a plurality of spaced apart peening portions.

5. A crawler shoe in accordance with claim 1 wherein said peening portions are each spaced apart by greater than 0.25 inches.

6. A crawler shoe in accordance with claim 5 wherein said peening portions are each spaced apart by about 0.5 inches.

7. A crawler shoe in accordance with claim 1 wherein each of said peening portions is about 1 inch square.

8. A crawler shoe in accordance with claim 1 wherein said crawler shoe further includes drive lugs attached to said upper surface of said main body on opposite sides of said roller path.

* * * * *